United States Patent [19]

Stoelzle

[11] Patent Number: 4,901,269

[45] Date of Patent: Feb. 13, 1990

[54] MULTIPLE-STAGE CARRY-SELECT ADDER HAVING UNIQUE CONSTRUCTION FOR INITIAL ADDER CELLS

[75] Inventor: Anton Stoelzle, Unterhaching, Fed. Rep. of Germany

[73] Assignee: Siemens Aktiengesellschaft, Berlin and Munich, Fed. Rep. of Germany

[21] Appl. No.: 87,829

[22] Filed: Aug. 21, 1987

[30] Foreign Application Priority Data

Aug. 27, 1986 [DE] Fed. Rep. of Germany ....... 3629011

[51] Int. Cl.[4] .............................................. G06F 7/50
[52] U.S. Cl. .................................................. 364/784
[58] Field of Search ............... 364/768, 784, 785, 786, 364/787, 788

[56] References Cited

U.S. PATENT DOCUMENTS

| | | | |
|---|---|---|---|
| 3,993,891 | 11/1976 | Beck et al. | 364/787 |
| 4,525,797 | 6/1985 | Holden | 364/788 |
| 4,623,982 | 11/1986 | Ware | 364/788 |
| 4,675,837 | 6/1987 | Ulbrich et al. | 364/788 |
| 4,704,701 | 11/1987 | Mazin et al. | 364/788 |

FOREIGN PATENT DOCUMENTS 0130397 1/1985 European Pat. Off. .
0164450 12/1985 European Pat. Off. .

Primary Examiner—David L. Clark
Assistant Examiner—Long T. Nguyen

[57] ABSTRACT

An adder, operating on the carry-select principle, provides for the transmission of two carry signals (c-0, c-1) and incorporates only one half-added (HA1) for the formation of the sum signal. Every adder stage (AS) of the adder is composed of an initial adder cell (AZA) and of a plurality of normal adder cells (AZN). The initial adder cell (AZA) forms a sum signal (s) from the supplied operand bits (a, b) upon employment of one of the two carry signals (c-0, c-1) and of a selection signal (e), which signals are permanently set. The normal adder cells (AZN) generate a sum signal from the operand bits supplied to them upon employment of one of two carry signals selected by the selection signal (e) supplied from the next-lower adder cell. The initial adder cell (AZA) and the normal adder cells (ANS) differ in their carry networks (CSA, CSN) which employ Manchester carry chains for the generation or transmission of the two carry signals (c-0, c-1). The adder cells are identically constructed and are particularly suited as basic cells for producing adders, using the CAD method.

7 Claims, 3 Drawing Sheets

MULTIPLE-STAGE CARRY-SELECT ADDER HAVING UNIQUE CONSTRUCTION FOR INITIAL ADDER CELLS

BACKGROUND OF THE INVENTION

This invention relates to an adder, and more particularly to an adder having a plurality of sub operand stages, for processing operands with widths greater than the width of the sub operand stages.

Various adder concepts have been devised in the past. The following types of adders have been considered in connection with bit slice operation: carry-ripple adders, carry-look ahead adders, carry-by-pass adders, carry-select adders. The function of these adders is disclosed, for example, in U.S. Pat. Nos. 3,993,891 and 3,316,393. Their functioning therefore need not be discussed in greater detail.

The object of the present invention is to specify an adder of the above type whose structure is as regular as possible, whereby the individual adder cells do not differ greatly in the size of their layout.

BRIEF DESCRIPTION OF THE INVENTION

This object is achieved in the present invention by an adder having, for each stage, an initial adder cell for the least significant bit of a sub operand and a plurality of identical adder cells for each of the more significant bits.

The adder of the present invention achieves the advantages that the number and complexity of the required circuits is low; the time for the sum formation is small; the structure of the adder is extremely regular, with no cross-connections to the data path; there are only two differently constructed adder cells, these being very similar; and the specified adder cells can be very easily employed as basic cells for a chip generator concept, in which an integrated circuit chip is designed by assembling a combination of basic cells to perform the required function, using CAD, for example.

BRIEF DESCRIPTION OF THE DRAWINGS

Reference will now be made to the accompanying drawings, in which.

DESCRIPTION OF THE PREFERRED EMBODIMENT

Figure 1:
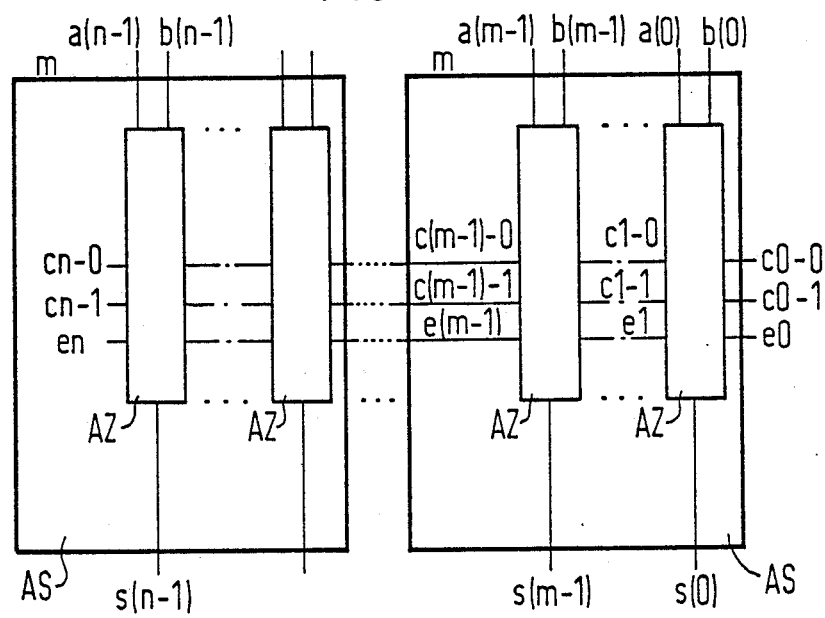
FIG. 1 illustrates a block circuit diagram of the adder.

FIG. 1 shows a block circuit diagram of the adder. This is composed of adder stages AS, each of which processes m bits of two operands to be operated with one another. Given the assumption that the operand width is n bits, n/m adder stages are required.

The adder operates on two operands a and b to form a sum s. The carry occurring in the addition is referenced c.

Figure 2:
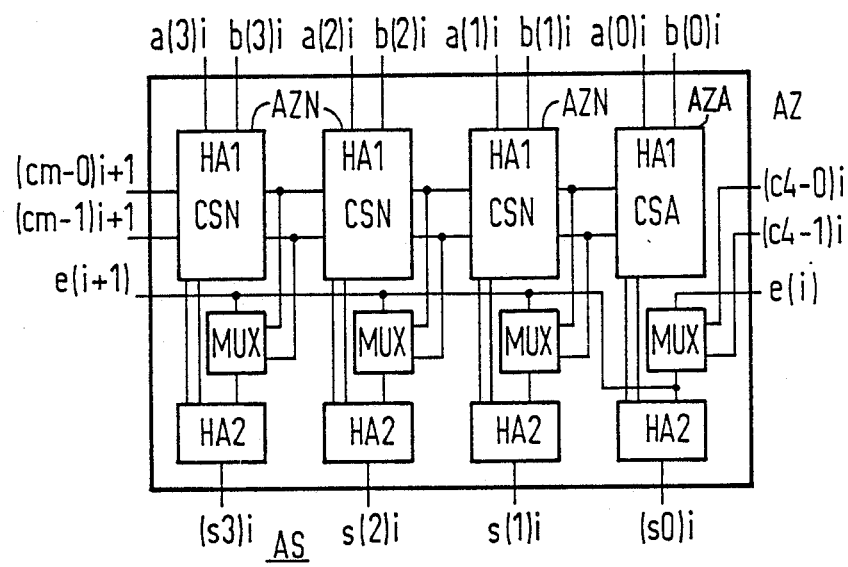
FIG. 2 illustrates a block circuit diagram of an adder stage.

It shall be assumed in the following description that every adder stage AS operates on sub-operands of 4 bits. Such an adder stage is shown in FIG. 2. It is composed of four adder cells AZA and AZN. Each adder cell respectively processes one bit of the operands a and b and generates one bit s of the result sum. Of the four adder cells AZ, three adder cells, namely, the adder cells AZN, are identically constructed, whereas the least-significant adder cell, namely, the adder cell AZA, is realized in a way different from the normal adder cells AZN. The exact structure of the adder cell AZA is shown in FIG. 3.; the exact structure of the normal adder cells AZN is shown in FIG. 4.

In FIG. 2, the $i^{th}$ (i=1, 2 ... n/m) adder stage is supplied with carry signals (C4−0)i and (C4−1)i which are employed in accord with the carry-select principle in order to connect one of the results generated in the adder cell through to the output as a sum signal. The selection of one of the carry signals is undertaken with the assistance of a selection signal e(i). The first adder cell AZA likewise generates two carry signals for the normal adder cell AZN which is arranged next. These carry signals are also employed in this cell for the purpose of connecting one of the sum signals generated in the adder cell through to the output. The selection between the carry signals is again undertaken by a selection signal e(+1).

The function of the adder cells AZ and, thus, of the adder stage shall be set forth in greater detail with reference to FIGS. 3 and 4.

Figure 3:
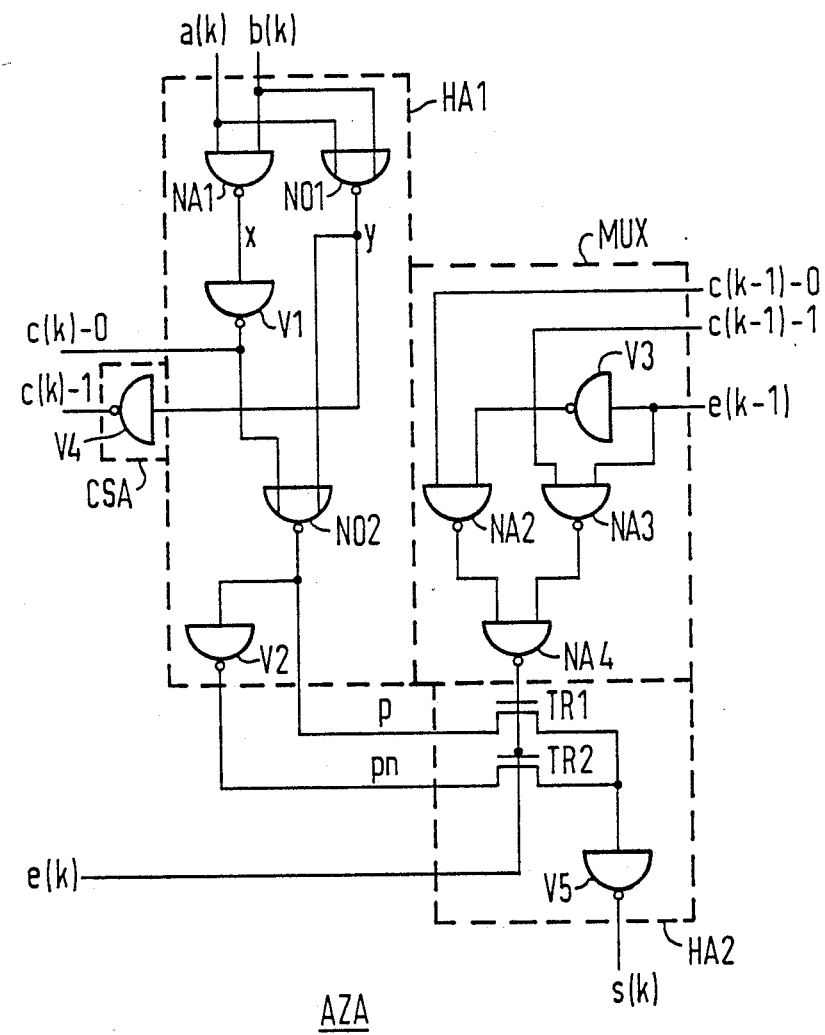
FIG. 3 illustrates the structure of the initial cell.
Figure 4:
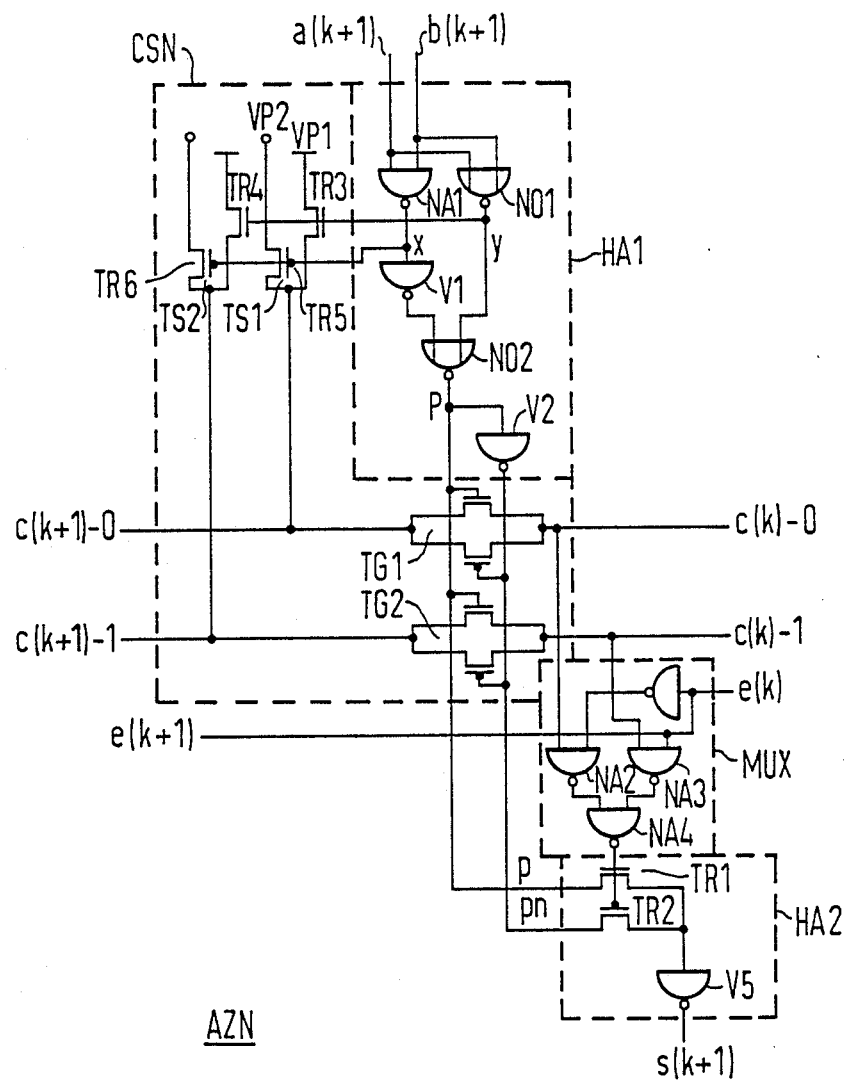
FIG. 4 illustrates the structure of the normal adder cell.

FIG. 3 shows the structure of the initial adder cell. This is composed of a first half-adder HA1, a multiplexer MUX, a second half-adder HA2 and a carry network CSN. The operand bits a and b are supplied to the first half-adder HA1, namely, to a NAND element NA1 and to an NOR element NO1. In accord with Table I, these generate the signals x and y from the operand bits a and b. The signal x is conducted via an inverter V1 and, together with the signal y, proceeds to an NOR element NO2. The signal p is output via the output of the NOR element NO2, and the signal pn is output inverted via an inverter V2. The values of x, y, p, pn may be derived from the table. One of the signals p or pn, output by the half-adder HA1, is the correct result. The selection is made with the assistance of the carry signals c-0 and c-1 supplied to the adder cell AZA. These carry signals can derive from a preceding adder stage or, respectively, they can be permanently set in the least-significant adder stage. In the latter, case, c-0 is selected as binary 0 and c-1 is selected as binary 1.

The selection regarding which of the carry signals c-0 or c-1 is employed for the through-connection of the signals p or pn is made by the multiplexer MUX, using a selection signal e. This selection signal e is set either by the adder stage with the next-lowest significance or is permanently set to binary 0 for the least significant stage. The multiplexer is composed of three NAND elements NA2, NA3, NA4 and an inverter V3.

With the assistance of a second half-adder stage HA2, one of the signals p or pn is connected through to the output of the adder cell as a sum signal s. To this end, the second half-adder HA2 is composed of a transistor TR1, a complementary transistor TR2 and an inveter element V5. The sum signal s appears at the output of the inverter element V5.

When the selection signal e is binary 0, then the carry signal c-0 determines which of the signals p or pn is employed as the sum signal after the inversion. When c-0 is binary 0, p is through-connected; when the carry signal c-0 is binary 1, then p is through-connected.

When the selection signal e is binary 1, then the carry signal c-1 is the determiner. When c-1 is binary 0, then the signal pn is through-connected; when the carry signal c-1 is binary 1, then the signal p is through-connected.

The through-connection thus ensues either via the transistor TR1 or via the transistor TR2, dependent on the multiplexer output signal, produced by the multiplexer MUX. This multiplexer output signal is further employed as selection signal for the remaining adder cells of the adder stage.

The carry network CSA in FIG. 3 is composed only of an inverter V4. The reason for this is that signals generated in the half-adder HA1 are utilized for the formation of the carry signals for the next adder cell. The carry signal c-0 for the next cell, a normal adder cell AZN, is formed by AND operation of the operand bits a and b; the carry signals c-1 is formed by OR operation of the operand bits a and b. FIG. 3 shows the initial adder cell for the k operand bits, whereby $k=1, 2$, etc. Accordingly, the carry signals which are supplied to the initial adder cell are referenced $c(k-1)-0$ and $c(k-1)-0$, the section signal is referenced $e(k-1)$ and the sum signal is referenced $s(k)$. The carry signals for the next adder cell, which must be a normal adder cell, are referenced $c(k)-0$, $c(k)-1$ and the selection signal for the remaining normal adder cells of the adder stage is referenced $e(k)$.

In accord with the table, the signals p and pn indicated in FIG. 3 represent the exclusive-OR operation of the oprand bits a and b for p and, inverted, for pn. The signal x represents the NAND operation of the operand bits a and b; the signal y represents the NOR operation of the operand bits a and b. The structure of the normal adder cell AZN is shown in FIG. 4. In comparison to the initial adder cell, there is only a difference in the carry network CSN and in the formation of the selection signal $e(k+1)$. The half-adders HA1 and HA2 and the multiplex circuit MUX are constructed in exactly the same way as in the initial adder cell AZA. The signals p and pn plus signals x and y are again acquired from the operand bits a and b with the assitance of the half-adder HA1. The required values are given in the table. With the assistance of the multiplex circuit MUX and of the selection signal $e(k)$, a decision is made, dependent on the carry signal $c(k)-0$ or $c(k)-1$, whether p or pn is used as sum signal $s(k+1)$ after the inverting.

Differing from the initial adder cell AZA, the selection signal for the following, normal adder cells is not newly formed but is merely forwarded.

The significant difference compared to the initial adder cell, however, is that the carry network CSN and, thus, the carries $c(k+1)-0$ and $c(k+1)-1$ are formed in a completely different way than in the initial adder cell. When the signal p from the half-adder HA1 is binary 1, then the carry signals $c(k)-0$ and $c(k)-1$ from the preceding adder cell are simply forwarded via transfer gates TG1 and TG2. When, by contrast, the signal p is binary 0, then two transistor circuits TS1 (composed of transistors Tr3, Tr5) and TS2 (composed of transistors TR4, TR6) are driven by the signals x and y so that either a first, fixed potential VP1 or a second, fixed potential VP2 is applied via the transistor to the lines for the carry signals $c(k+1)-0$ and $c(k+1)-1$. When p is binary 0 and the operand signals a and b are likewise binary 0, then the fixed potential VP1 is applied to the lines for the carry signals via the transistor circuits TS1 and TS2, so that both carry signals $c(k+1)-0$ and $c(k+1)-1$ are binary 0. When, by contrast, the operand signals a and b are binary 1 and p is binary 0, then the second fixed potential VP2 is applied to the lines for the carry signals via the transistor circuits TS1 and TS2. $c(k+1)-0$ and $c(k+1)-1$ are then binary 1.

The adder thus functions similarly to a carry-select adder, but employes a Manchester carry chain for the carry formation. Further, the first half-adder HA1 responsible for the sum formation is not redundantly executed and hardware is thus saved. Only two types of adder cell AZA and AZN are needed for constructing any adder stage. Only the initial adder cell AZA differs from the remaining adder cells AZN. The result is that an adder (or a complete function slice) has to be constructed of only two different cells that, given a four-bit adder stage, the carry signal only need traverse three Manchester carry stages, in the worst case, in order to proceed to the output of the adder stage and that only one multiplexer per adder cell is required.

TABLE I

| a | b | p | pn | x | y |
|---|---|---|----|---|---|
| 0 | 0 | 0 | 1  | 1 | 1 |
| 0 | 1 | 1 | 0  | 1 | 0 |
| 1 | 0 | 1 | 0  | 1 | 0 |
| 1 | 1 | 0 | 1  | 0 | 0 |

It will be apparent that various modifications and/or additions may be made in the apparatus of the invention without departing from the essential features of novelty involved, which are intended to be defined and secured by the appended claims.

What is claimed is:

1. An adder for processing n-bit-wide operands (a,b) with the assistance of n/m adder stages, each having a processing width of m-bits for m-bit-wide sub-operands, each adder stage comprising in combination:

(a) an initial adder coil (AZA) for the least significant bit of a sub-operand and m-1 normal adder cells (AZN), constructed alike, one each for the remaining bits of the sub-operand;

(b) each adder cell (AZA, AZN) being connected to receive a first carry-in signal and a second carry-in signal from a next-lower adder cell, to generate a sum signal (S) from the operand bits supplied to it and from one of said carry-in signals, and to generate a first carry-out signal and a second carry-out signal, said carry-out signals are supplied to a next adder cell of this stage or the initial adder cell of the next higher adder stage as said carry-in signals;

(c) said initial adder cell having means for generating said sum signal by selecting one of said carry-in signals supplied to it in response to a first selection signal, said carry-in signals are permanently set to logic 0 at the least significant adder stage, otherwise the carry signals are supplied from the next-lower stage, for generating a second selection signal for the next higher adder stage by transferring from said initial adder cell to the next higher adder stage, the carry-in signal which is used to generate the sum signal, for generating a first carry-out signal by an AND operation from the operand bits supplied to it and a second carry-out signal by an OR-operation of said operand bits;

(d) each normal adder cell (AZN) having means for generating said sum signal by selecting one of said carry-in signals supplied to it in response to said second selection signal, for generating carry-out signals which are identical to said received carry-in signals when the supplied operand bits have different logic values, which are logic 0 when both operand bits are logic 0 and which are logic 1 when both operand bits are logic 1, for transferring the second selection signal to the next adder cell of said stage or to the initial adder cell of the next higher adder stage as said first selection signal.

2. The adder according to claim 1, wherein each of said adder cells (AZN, AZA) comprises:
- a first half-adder (HA1) which carries out an exclusive-OR operation of the supplied operand bits ($a_i$, $b_i$) and manifests the result of said exclusive-OR operation in inverted (pn) and non-inverted (p) form;
- a multiplexer circuit (MUX) which connects one of the carry-in signals (c-0, c-1) through to the multiplexer output dependent on a selection signal (e);
- a second half-adder (HA2) which connects the result (p, pn) through to an adder cell output as a sum signal (s), dependent on the multiplexer output signal; and
- a carry network (CSA, CSN) which generates the two carry-out signals (c-0, c-1) for the next-higher adder cell.

3. The adder according to claim 2, wherein said first half-adder comprises:
- a first NAND element (NA1) and a first NOR element (NO1) each connected to receive the operand bits ($a_i$, $b_i$) to be operated;
- a second NOR element (NO2) which is connected to the output of the first NOR element (NO1) a first inverter element (V1) connected to the output of the first NAND element (NA1), and said second NOR element generates the result (p); and
- a second inverter element (V2) which is connected to the output of the second NOR element (NO2) and which generates the operation result (p) in inverted form (pn).

4. The adder according to claim 2 or 3, wherein said second half-adder (HA2) comprises:
- a first transistor (TR1) controlled by the multiplexer output and arranged between the second NOR element (NO2) of the first half-adder and the input of a third inverter (V5); and
- a transistor (TR2) complementary to the first transistor (TR1) controlled by the multiplier output and arranged between the output of the second inverter element (V2) of the first half-adder and the input of the third inverter element (V5).

5. The adder according to claim 2, wherein said carry network (CSA) comprises a fourth inverter element (V4) which is connected to the output of the first NOR element (NO1) of the first half-adder, and at whose output one of said two carry-out signals (c-1) for the next adder cell is output, the other of said two carry-out signals (c-0) being taken at the output of the first inverter element (V1) of the first-half adder.

6. The adder comprising to claim 2, wherein said carry network comprises:
- a first transistor pair (TG1) of complementary transistors connected in parallel which transmits a first carry-out signal (c-0) from the preceding adder cell to the next adjacent one, and a second transistor pair (TG2) of complementary transistors connected in parallel which transmits a second carry-out signal (c-1) from the preceding adder cell to the next, whereby one transistor of each transistor pair (TG1), (TG2) is controlled by the result (p) and the other transistor of each transistor pair is controlled by the inverter result (pn) of the first half-adder;
- two transistors (TR3, TR4) of a first conductivity type whose control input is connected to the output of the first NOR element (NO1) of the first half-adder and whose current conductive path is connected between a fixed potential (VP1) corresponding to binary 0 and said carry-out signals; and
- two transistors of a second conductivity type (TR5, TR6) whose control input is connected to the output of the first NAND element (NA1) and whose current conductive path is connected between a fixed potential (VP2) corresponding to binary 1 and said carry-out signals.

7. The adder according to one of the claim 2, 3 or 4, wherein said multiplexer circuit (MUX) comprises:
- a second NAND element (NA2) to which the one carry-in signal (c-0), and the selection signal (e) through an inverter, is supplied;
- a third NAND element (NA3) to which the other carry-in signal (c-1) is supplied and to which the selection signal (e) is directly supplied;
- a fourth NAND element (NA4) which is connected to the outputs of the second and third NAND elements and which forms the multiplexer output.

* * * * *